United States Patent
Feng et al.

(10) Patent No.: US 9,281,236 B2
(45) Date of Patent: Mar. 8, 2016

(54) EMBEDDED ON-CHIP SECURITY

(71) Applicant: International Business Machines Corporation, Armonk, NY (US)

(72) Inventors: Kai D. Feng, Hopewell Junction, NY (US); Wai-Kin Li, Hopewell Junction, NY (US); Ping-Chuan Wang, Hopewell Junction, NY (US); Zhijian Yang, Stormville, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/718,128

(22) Filed: May 21, 2015

(65) Prior Publication Data
US 2015/0255326 A1 Sep. 10, 2015

Related U.S. Application Data

(62) Division of application No. 14/032,218, filed on Sep. 20, 2013, now Pat. No. 9,117,824.

(51) Int. Cl.
*H03K 19/00* (2006.01)
*H01L 21/768* (2006.01)
(Continued)

(52) U.S. Cl.
CPC .... *H01L 21/76802* (2013.01); *H01L 21/76838* (2013.01); *H01L 21/76877* (2013.01);
(Continued)

(58) Field of Classification Search
CPC ............. G06F 27/76; H03K 19/17768; G01R 31/318385
USPC ............... 326/8, 113; 714/724–728, 738–739
See application file for complete search history.

(56) References Cited

U.S. PATENT DOCUMENTS 5,790,626 A * 8/1998 Johnson ................. G11C 19/00
377/69
6,518,180 B1 2/2003 Fukuda
(Continued)

OTHER PUBLICATIONS

Sreedhar et al., "Physically Unclonable Functions for Embeded Security based on Lithographic Variation", Design, Automation & Test in Europe Conference & Exhibition, Publication Year: 2011, pp. 1-6.
(Continued)

*Primary Examiner* — Jason M Crawford
(74) *Attorney, Agent, or Firm* — Catherine Ivers; Andrew M. Calderon; Roberts Mlotkowski Safran & Cole, P.C.

(57) ABSTRACT

Embodiments of the invention include a semiconductor structure containing a back end of line randomly patterned interconnect structure for implementing a physical unclonable function (PUF), a method for forming the semiconductor device, and a circuit for enabling the interconnect structure to implement the physical unclonable function. The method includes forming a semiconductor substrate and a dielectric layer on the substrate. The randomly patterned interconnect structure is formed in the dielectric layer. The random pattern of the interconnect structure is used to implement the physical unclonable function and is a result of defect occurrences during the manufacturing of the semiconductor structure. The circuit includes n-channel and p-channel metal oxide semiconductor field effect transistors (MOSFETs) and the randomly patterned interconnect structure, which acts as electrical connections between the MOSFETs. The random electrical connections between MOSFETs are utilized for generation of unique keys for purposes such as authentication or identification.

2 Claims, 6 Drawing Sheets

(51) Int. Cl.
*H01L 23/535* (2006.01)
*H01L 23/00* (2006.01)
*H03K 19/003* (2006.01)
*H03K 19/0948* (2006.01)

(52) U.S. Cl.
CPC ............ *H01L23/535* (2013.01); *H01L 23/564* (2013.01); *H01L 23/57* (2013.01); *H03K 19/003* (2013.01); *H03K 19/0948* (2013.01); *H01L 2924/0002* (2013.01)

(56) References Cited

U.S. PATENT DOCUMENTS

| | | | |
|---|---|---|---|
| 6,645,864 | B1 | 11/2003 | Lin et al. |
| 7,259,106 | B2 | 8/2007 | Jain |
| 7,898,283 | B1 * | 3/2011 | Koushanfar ............ G06F 21/72 326/47 |
| 8,759,976 | B2 | 6/2014 | Edelstein et al. |
| 2010/0315153 | A1 | 12/2010 | Oksanen et al. |
| 2011/0163088 | A1 | 7/2011 | Besling et al. |
| 2011/0254141 | A1 | 10/2011 | Roest et al. |
| 2012/0168506 | A1 | 7/2012 | Ruehrmair et al. |
| 2013/0307578 | A1 | 11/2013 | Ostertun et al. |
| 2014/0042627 | A1 | 2/2014 | Edelstein et al. |
| 2015/0084193 | A1 | 3/2015 | Feng et al. |

OTHER PUBLICATIONS

Fitzpatrick, "Magneprint technology licensed to TRAX Systems, Inc.", Washington University in St. Louis, Newsroom, Nov. 11, 2204, http://news.wustl.edu/news/Pages/4159.aspx, pp. 1-2.

Kumar et al., "Extended Abstract: The Butterfly PUF Protecting IP on every FPGA", In IEEE International Workshop on Hardware Oriented Security and Trust, Anaheim 2008, pp. 1-4.

Gassend et al., "Silicon Physical Random Functions", CCS'02 Nov. 18-22, 2002, Washington, DC, pp. 148-160.

* cited by examiner

EMBEDDED ON-CHIP SECURITY

The present invention relates generally to semiconductor devices, and more particularly, relates to a semiconductor device containing a randomly patterned interconnect structure for implementing a physical unclonable function (PUF).

BACKGROUND

The use of integrated circuits (ICs) to store sensitive data and carry out secure transactions has become increasingly ubiquitous. As a result, ICs often require protection against attacks that aim to extract information. A physical unclonable function (PUF) is a cost-effective way of providing an extra layer of protection against physical attacks. Rather than storing secret keys in non-volatile memory, which is often difficult and expensive, a PUF extracts secrets from complex physical systems. Typically, a PUF is a function that is embodied in a physical structure and is easy to evaluate but hard to predict. The physical structure that contains the PUF consists of at least one random component, the making of which cannot be easily controlled. Applications of PUF include challenge-response authentication, where access depends on providing correct responses to challenges, and the challenge-response pairs are generated by a PUF. Previous efforts of implementing PUFs have focused primarily on generating randomness utilizing active devices and operating conditions, such as voltage or temperature.

SUMMARY

Aspects of the present invention provide a semiconductor device, method, and circuit for implementing a physical unclonable function (PUF) utilizing, in one embodiment, a back end of line randomly patterned interconnect structure.

In an aspect of the invention, a semiconductor device includes a dielectric layer disposed on a substrate. A randomly patterned interconnect structure implements a physical unclonable function (PUF). The randomly patterned interconnect structure is disposed in the dielectric layer, and the randomly patterned interconnect structure includes an array of conductive elements. A plurality of adjacent conductive elements are randomly connected by a plurality of connection regions, respectively, and insulated electrically by a plurality of insulation regions, respectively, and fabrication defects cause the insulation regions between the adjacent conductive elements to form the randomly patterned interconnect structure.

In another aspect of the invention, a method of forming a semiconductor device includes forming a dielectric layer disposed on a substrate. A randomly patterned interconnect structure is formed by patterning a hardmask layer disposed on the dielectric layer. The patterning includes a first patterning delineating a plurality of electrical connection regions and a plurality of electrical insulation regions. The electrical insulation regions are caused by fabrication defects, and the patterning includes a second patterning delineating a plurality of conductive elements. Trenches are formed in regions of the dielectric layer not protected by the patterned hardmask layer, and the trenches are filled with conductive material.

In another aspect of the invention, an integrated circuit includes a reset input and a clock input, and a circular shift logic, for use in producing circularly shifting test patterns. The circular shift logic comprises the reset and clock input and one or more outputs and complement outputs. The one or more outputs are operatively connected with the reset input and the clock input, wherein each output corresponds to a complement output. A plurality of n-channel metal-oxide-semiconductor field-effect transistors (nMOSFET) are included, wherein a nMOSFET comprises a gate, a source, and a drain, and wherein the source is operatively connected with zero voltage, the gate is operatively connected with an output of the circular shift logic, and the drain is operatively connected with a conductive element of the randomly patterned interconnect structure. A plurality of p-channel metal-oxide-semiconductor field-effect transistors (pMOSFET) are included. Each pMOSFET corresponds to a nMOSFET, the pMOSFET is operatively connected with a conductive element of the randomly patterned interconnect structure adjacent to the conductive element operatively connected with the corresponding nMOSFET. A pMOSFET comprises a gate, a source, and a drain, wherein the source is operatively connected with a voltage source, the gate is operatively connected with a complement output of the circular shift logic, and the drain is operatively connected with a conductive element of the randomly patterned interconnect structure.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

DETAILED DESCRIPTION

Figure 1A:
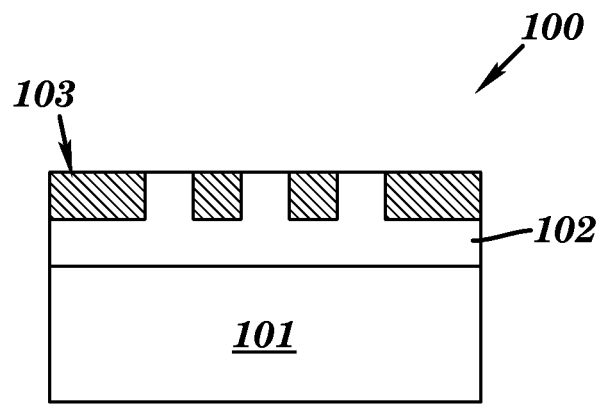
FIGS. 1A and 1B depict cross-sectional and top views, respectively, of a semiconductor device containing a back end of line randomly patterned interconnect structure for implementing a physical unclonable function (PUF) according to one embodiment of the present invention.

Exemplary embodiments of the present invention will now be described in detail with reference to the accompanying drawings. However, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of this disclosure. It will be understood that when an element as a layer or region, is referred to as being "on" or "over", "disposed on", "disposed over", "deposited on", or "deposited over" another element, it can be directly on the other element or intervening elements may also be present. In contrast, when an element is referred to as being "directly on", "directly over", or "disposed proximately to" another element, there are no intervening elements present. Furthermore, it will be understood that when an element as a layer or region is referred to as being "adjacent to" or "disposed adjacent to" another element, it can be directly adjacent to the other element or intervening elements may be present.

In accordance with features of the invention, a semiconductor device, method, and circuit for implementing a physical unclonable function (PUF) utilizing, in one embodiment, a back end of line (BEOL) randomly patterned interconnect structure, are provided and shown in the figures. The semiconductor device, method and circuit for a PUF utilizing a randomly patterned interconnect may be applied to other points of the semiconductor fabrication process. For example, the method and system provided herein can be applied at the front end of line (FEOL). The method and system disclosed herein when applied in the FEOL process can be implemented, for example, for silicon/or poly silicon wire. The interconnect structure acts as a plurality of electrical connections for electrical components within a circuit, where the interconnect structure randomly establishes electrical connections between components. The randomly patterned interconnect structure contains an array of conductive elements, where adjacent conductive elements are either randomly connected or insulated electrically. Consequently, the number of possible random pattern variations depends on the number of conductive elements within a randomly patterned interconnect structure. Hence, a back end of line randomly patterned interconnect structure has the potential to generate a wide range of variations utilizing passive components. Additionally, the complexity of challenge-response pairs generated by a randomly patterned interconnect structure increases as the number of conductive elements within the interconnect structure increases, leading to more resilient protections.

Figure 1B:
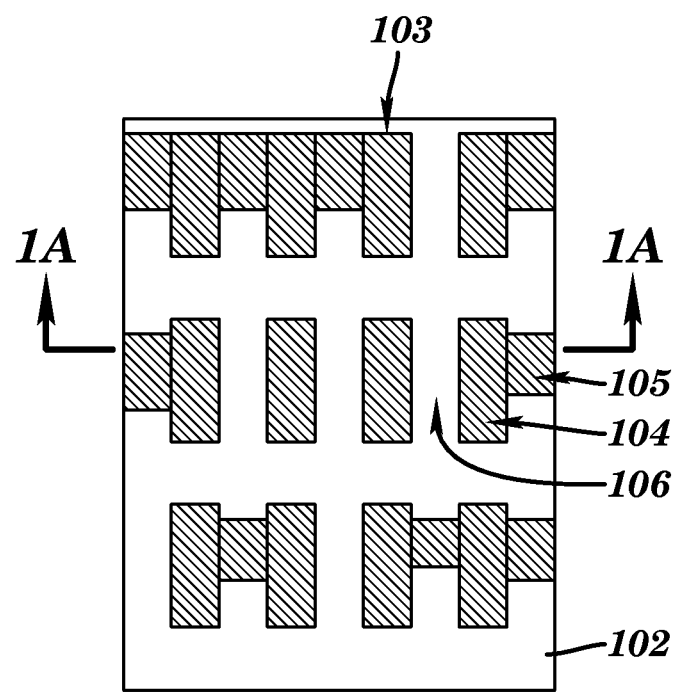

Referring to FIGS. 1A and 1B, an exemplary semiconductor device 100 containing a back end of line randomly patterned interconnect structure 103 for implementing a physical unclonable function (PUF) is depicted. FIGS. 2A through 5B depict a method for manufacturing a semiconductor device according to an exemplary embodiment of the invention. FIG. 6 depicts a circuit for executing a PUF utilizing the randomly patterned interconnect structure 103 within a semiconductor device, according to an exemplary embodiment of the invention.

Referring to FIG. 1A, a cross-sectional view of an exemplary semiconductor device 100 containing a back end of line randomly patterned interconnect structure 103 for implementing a PUF is shown. The semiconductor device 100 includes a substrate 101, a dielectric layer 102, and a randomly patterned interconnect structure 103. The dielectric layer 102 is disposed on the substrate 101, and the randomly patterned interconnect structure 103 is disposed in the dielectric layer 102. In an embodiment of the present invention, the substrate 101 may include silicon, silicon dioxide, aluminum oxide, sapphire, germanium, gallium arsenide, an alloy of silicon and germanium, or indium phosphide. In an embodiment of the present invention, the dielectric layer 102 may include, but is not limited to, fluorosilicate glass, carbon-doped silicon dioxide, porous silicon dioxide, porous carbon-doped silicon dioxide, spin-on organic polymeric dielectrics, or spin-on silicon based polymeric dielectric. In an embodiment of the present invention, the randomly patterned interconnect structure 103 may include, for example, but is not limited to, copper or aluminum.

Referring to FIG. 1B, a top view of the semiconductor device 100 containing a back end of line randomly patterned interconnect structure 103 for implementing a PUF is shown. The randomly patterned interconnect structure 103 acts as a plurality of electrical connections within a circuit for executing a PUF. The randomly patterned interconnect structure 103 includes one or more conductive elements 104, electrical connection regions 105, and electrical insulation regions 106. Within randomly patterned interconnect structure 103, the conductive elements 104 are arranged in an array layout, with adjacent conductive elements 104 either linked by electrical connection regions 105 or electrical insulation regions 106. The random nature of the interconnect structure 103 comes from the possibility of either electrical connection regions 105 or electrical insulation regions 106 being formed between adjacent conductive elements 104, where the appearance of electrical insulation regions 106 is a result of defects happening during manufacturing.

When adjacent conductive elements 104 are linked by an electrical connection region 105, an electrical current can pass through them. Alternatively, when adjacent conductive elements 104 are linked by an electrical insulation region 106, an electrical current cannot pass through them. When integrated into a circuit, conductive elements 104 and electrical connection regions 105 permit the flow of currents, while electrical insulation regions 106 prevent the flow of currents.

A method for manufacturing a semiconductor device according to an exemplary embodiment of the invention is shown in FIGS. 2A through 5B. During manufacturing, a substrate 101 is provided. The substrate 101 may be formed from a semiconductor material. For example, the substrate 101 may include, but is not limited to, a material or a combination of materials selected from a group made up of the following materials: silicon, silicon germanium, silicon carbide. The substrate 101 may also be made from other materials. For example, the substrate 101 may include, but is not limited to, a material or a combination of materials selected from a group made up of the following materials: sapphire, glass, and organic material. The substrate 101 may also be formed by stacking a plurality of layers as desired. For example, the substrate 101 may include an insulating layer and a semiconductor layer located on the insulating layer, thereby forming a so-called SOI substrate. Next, a dielectric layer 102 may be formed over a surface of the substrate 101. In an embodiment of the present invention, dielectric layer 102 may include, but is not limited to, fluorosilicate glass, carbon-doped silicon dioxide, porous silicon dioxide, porous carbon-doped silicon dioxide, spin-on organic polymeric dielectrics, or spin-on silicon based polymeric dielectric. Randomly patterned interconnect structure 103 is formed next in the dielectric layer 102. In an embodiment of the present invention, randomly patterned interconnect structure 103 may include, but is not limited to, copper or aluminum.

Forming the randomly patterned interconnect structure 103 disposed on and adjacent to the dielectric layer 102 may require two patterning steps during the fabrication process. One patterning step etches the pattern of electrical connection regions 105 and electrical insulation regions 106 onto a hardmask layer, while the other patterning etches the pattern of an array of conductive elements 104 onto the same hardmask layer. The array of conductive elements 104 can be embodied as an array of metal wire segments. After the two patterning steps, the resulting pattern on the hardmask layer is etched onto dielectric layer 102 and metalized to form a randomly patterned interconnect structure 103.

Figure 2A:
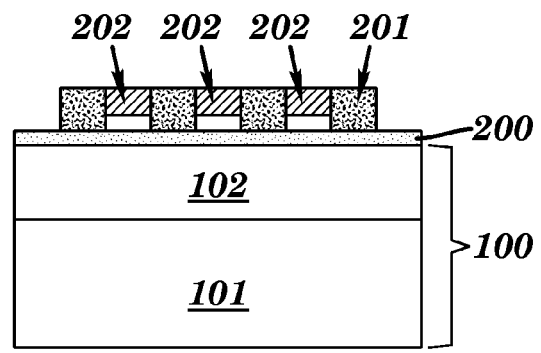
FIGS. 2A and 2B depict cross-sectional and top views, respectively, of a semiconductor device during a first patterning of a hardmask layer, where defects are introduced, according to one embodiment of the present invention.

In FIG. 2A, a cross-sectional view of the semiconductor device 100 during a first patterning of a hardmask layer 200 is shown. The random pattern of interconnect structure 103 is a result of two step photoresist patterning process. In an embodiment of the present invention, the hardmask layer 200 may be used as an intermediate layer between the patterned photoresist layers and the underlying material that can be patterned by transfer from the patterned photoresist layers. The hardmask layer should be able to receive the pattern from the patterned resist layer and withstand etching required to transfer the pattern to the underlying material. The hardmask layer 200 may include, but is not limited to, spin-coatable polymer or a film created by chemical vapor deposition and is formed on the dielectric layer 102. A first photoresist layer 201 may include, but is not limited to, poly (methyl methacrylate), poly (methyl glutarimide), phenol formaldehyde resin, or SU-8 and is formed on the hardmask layer 200. The first photoresist layer 201 patterns the electrical connection regions 105 and electrical insulation regions 106 of the interconnect structure 103, and a second photoresist layer (shown in FIG. 4A as photoresist layer 401) patterns the conductive elements 105 of the interconnect structure 103. Defects 202 within the first photoresist layer 201 result in the electrical insulation regions 106 of the interconnect structure 103. In an embodiment of the present invention, the defects 202 may be a result of, but is not limited to, the inhomogeneous distribution of photo acid generator (PAG), molecular weight polymer of photoresist layer 201.

Figure 2B:
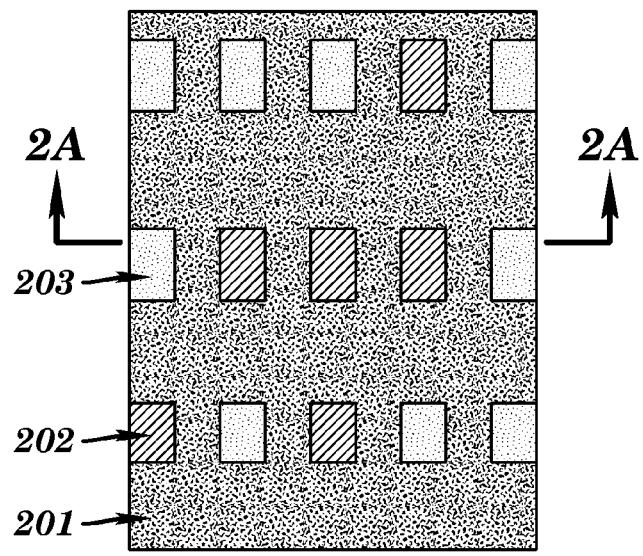

Referring to FIG. 2B, the semiconductor device 100 during the patterning of electrical connection regions 105 and electrical insulation regions 106 onto the hardmask layer 200 is shown. The first photoresist layer 201 is formed on the hardmask layer 200. Electrical connection regions 105 in the randomly patterned interconnect structure 103 is a result of openings 203 in the pattern of the first photoresist layer 201, and electrical insulation regions 106 in the randomly patterned interconnect structure 103 are a result of defects 202 in the pattern of the first photoresist layer 201.

Figure 2C:
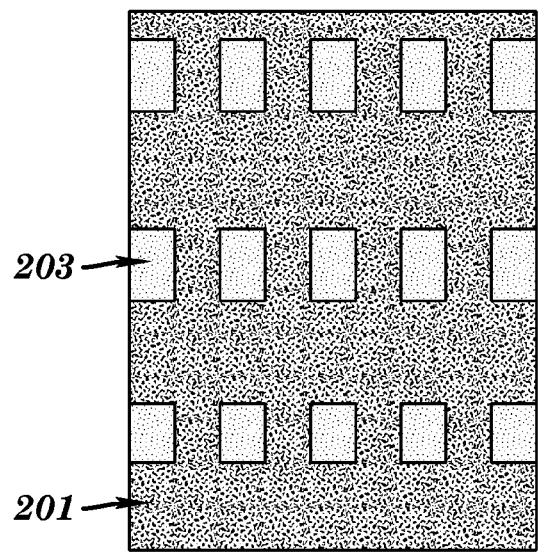
FIG. 2C depicts a top view of an illustrative structure containing a photoresist layer without defects.

Referring to FIG. 2C, a photoresist layer 201 without defects is shown. Without defects, the photoresist layer 201 includes openings 203 arranged in an array layout, and no random patterns will emerge as a result. Therefore, without defects occurring during manufacturing, the resulting interconnect structure would be an array of conductive elements, where all adjacent conductive elements are linked by electrical connection regions. However, with defects occurring during manufacturing, some of the electrical connection regions within the interconnect structures are replaced with electrical insulation regions.

Figure 3A:
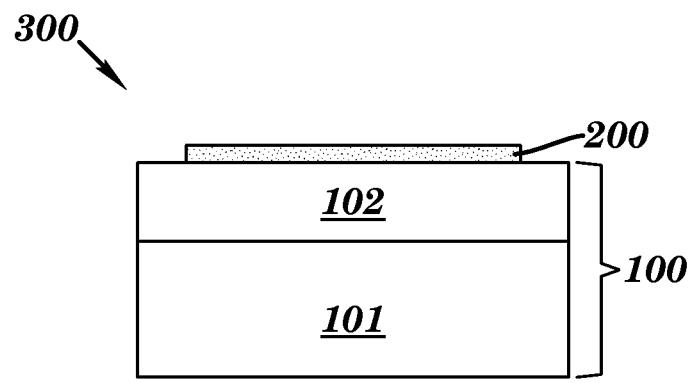
FIGS. 3A and 3B depict cross-sectional and top views, respectively, of a semiconductor device after etching of a first pattern onto a hardmask layer according to one embodiment of the present invention.

Referring to FIG. 3A, a cross-sectional view of the semiconductor device 100 after etching of the first pattern onto hardmask layer 200 is shown. Possible etching technologies may include, but are not limited to, reactive ion etching (RIE), anisotropic RIE, isotropic RIE, wet etching, plasma etching, or ion milling. After etching, the pattern of the first photoresist layer 201 is transferred onto the hardmask layer 200. Openings 300 in the hardmask layer 200 are a result of transferring the openings 203 in the first photoresist layer 201 onto the hardmask layer 200. The hardmask layer 200 in the cross-sectional view is continuous in the middle portion because defects 202 in the first photoresist layer 201 (shown in FIG. 2A) prevented openings from forming in parts of the hardmask layer 200.

Figure 3B:
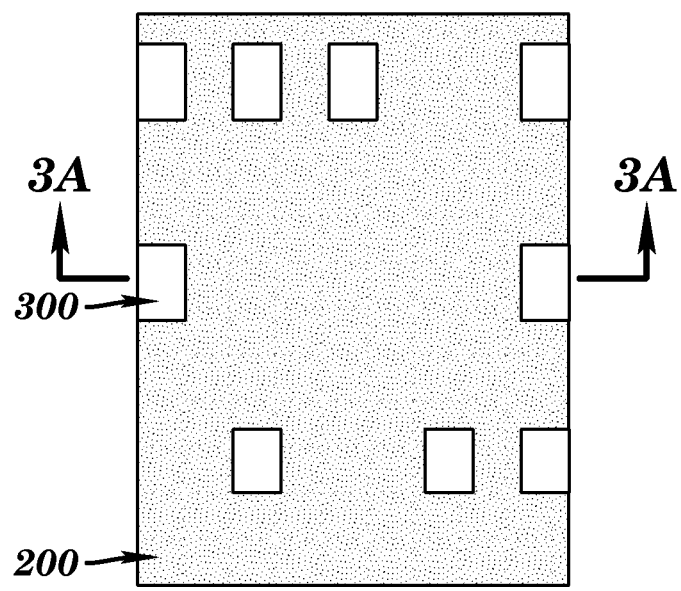

Referring to FIG. 3B, the semiconductor device 100 after etching of the first pattern onto the hardmask layer 200 is shown. Hardmask layer 200 is formed on the dielectric layer 102. The first pattern transfers onto the hardmask layer 200 the electrical connection regions 105 and electrical insulation regions 106 of the randomly patterned interconnect structure 103 (shown in FIG. 1). Hence, openings 300 in the hardmask layer 200 will result in electrical connection regions 105 in the randomly patterned interconnect structure 103. The areas where defects 202 prevented openings from forming in the hardmask layer 200 will result in electrical insulation regions 106 in the randomly patterned interconnect structure 103.

Figure 4A:
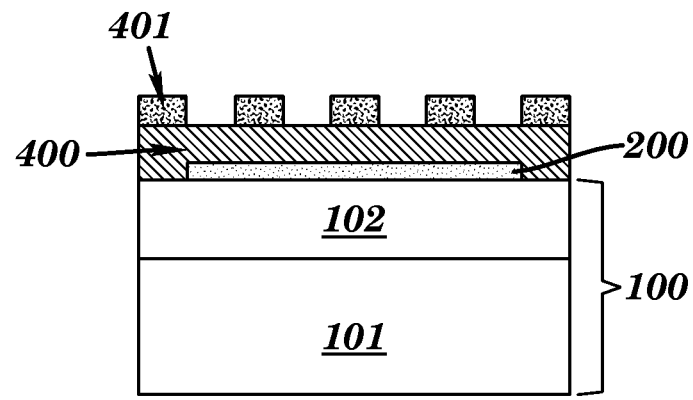
FIGS. 4A and 4B depict cross-sectional and top views, respectively, of a semiconductor device during a second patterning of a hardmask layer, according to one embodiment of the present invention.

Referring to FIG. 4A, a cross-sectional view of semiconductor device 100 during a second patterning of the hardmask layer 200, utilizing a second photoresist layer 401. An organic planarization layer (OPL) 400 may be formed on the hardmask layer 200, and the second photoresist layer 401 is formed on the OPL 400. The OPL 400 may include, but is not limited to, organic polymers, methylsiloxane spin-on-glass, or silicate spin-on-glass. The OPL 400 provides a planar surface upon which to form the second photoresist layer 401. The second photoresist layer 401 may include, but is not limited to, poly(methyl methacrylate), poly(methyl glutarimide), phenol formaldehyde resin, or SU-8. The second pattern transfers onto the hardmask layer 200 the conductive elements 104 (shown in FIG. 1). Hence, the second photoresist layer 401 includes an array of openings.

Figure 4B:
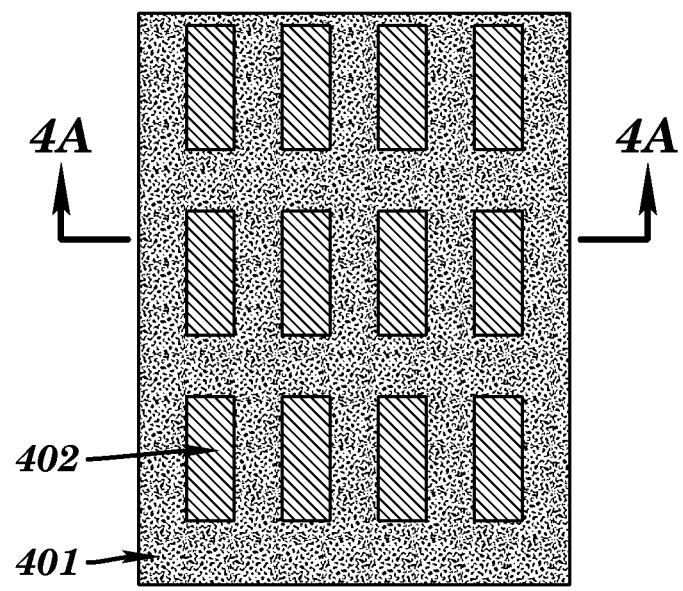

Referring to FIG. 4B, the semiconductor device 100 during a second patterning of the hardmask layer 200 is shown. The openings 402 in the second photoresist layer 401 result in the conductive elements 104 of the randomly patterned interconnect structure 103. After the second patterning, the final pattern on the hardmask layer 200 will be the random interconnect pattern of the interconnect structure 103 in the semiconductor device 100.

Figure 5A:
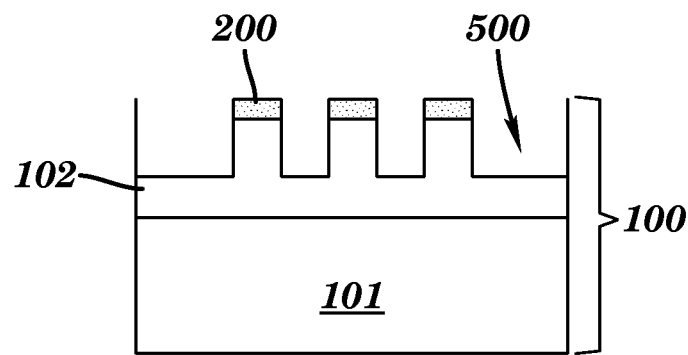
FIGS. 5A and 5B depict cross-sectional and top views, respectively, of a semiconductor device after etching of a dielectric layer, according to one embodiment of the present invention.
Figure 6:
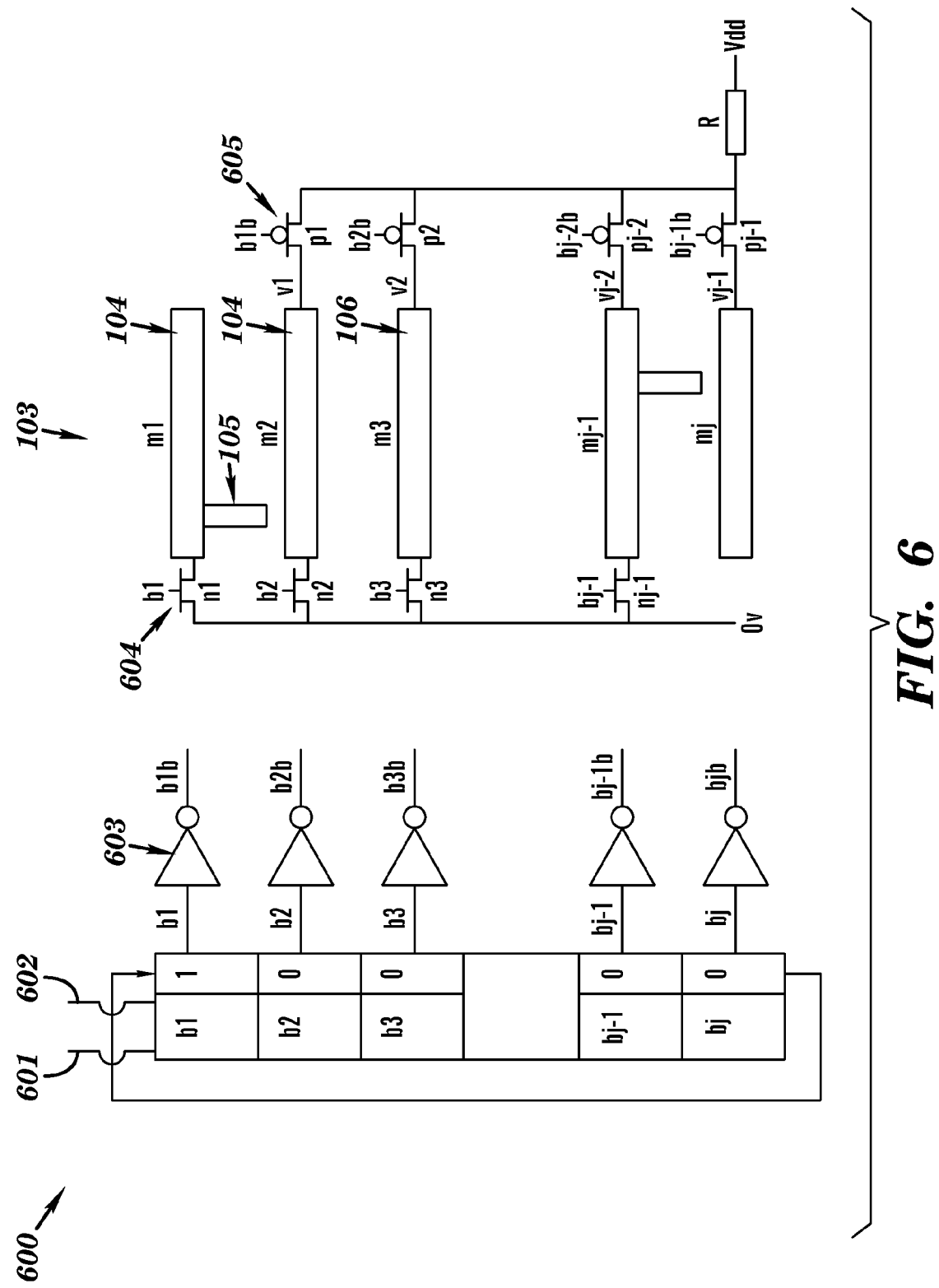
FIG. 6 depicts a schematic of a circuit for executing a PUF utilizing the randomly patterned interconnect structure of a semiconductor device according to one embodiment of the present invention.

Referring to FIG. 5A, the semiconductor device 100 after etching of the dielectric layer 102, when the final pattern is transferred from the hardmask layer 200 onto the dielectric layer 102 is shown. Possible etching technologies may include, but are not limited to, reactive ion etching (RIE), anisotropic RIE, isotropic RIE, wet etching, plasma etching, or ion milling. Before etching, the second photoresist layer 401 and the organic planarization layer 400 are stripped. During etching, trenches 500 are formed in the dielectric layer 102 in regions not protected by the hardmask layer 200, thereby transferring the random interconnect pattern from the hardmask layer 200 onto the dielectric layer 102.

Figure 5B:
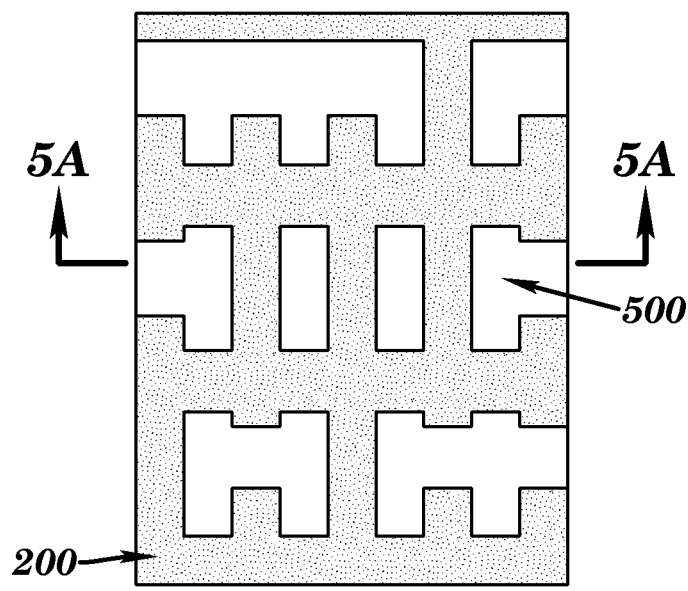

The semiconductor device 100 after etching of the dielectric layer 102 is shown in FIG. 5B. The trenches 500 represent the conductive portions of the random interconnect pattern of the interconnect structure 103, including the conductive elements 104 and the electrical connection regions 105. Once trenches 500 are formed in the dielectric layer 102, the hardmask 200 is stripped. After removal of the hardmask layer 200, the trenches 500 are filled with conductive materials to form the final randomly patterned interconnect structure 103 shown in FIG. 1.

FIG. 6 is a schematic of an exemplary circuit for executing a physical unclonable function (PUF) utilizing the randomly patterned interconnect structure in an exemplary semiconductor device. The circuit includes a j-bit circular shift register, a plurality of n-channel metal-oxide-semiconductor field-effect transistors (nMOSFET) 604, a plurality of p-channel metal-oxide-semiconductor field-effect transistors (pMOSFET) 605, and randomly patterned interconnect structure 103. Randomly patterned interconnect structure 103 includes conductive elements 104, electrical connection regions 105, and electrical insulation regions 106.

The conductive elements 104 of interconnect structure 103 are operatively connected to the drains of nMOSFETs 604 and pMOSFETs 605. The drain of nMOSFET n1 is operatively connected to conductive element m1, and so forth. The drain of pMOSFET p1 is operatively connected to conductive element m2, and so forth.

Circular shift register 600 produces outputs with length of j-bits, corresponding to the number of conductive elements 104. When the circular shift register 600 is reset by a signal reset 601, output bits b2 through bj are reset to logic low and b1 is reset to logic high. When a clock pulse 602 is applied to circular shift register 600, the logic status of b1 shifts to b2, and so forth, and the logic status of bj shifts to b1, making a circular shift. Therefore, in the entire operation, only one bit is at logic high at any given output.

Circular shift register 600 also provides complement output bits b1$b$ through bj$b$. NOT gates 603 perform the NOT logical operation on bits b1 through bj to create complement output bits b1$b$ through bj$b$.

Bits b1 through bj-1 control the gate operation of nMOSFETs n1 through nj-1, while complement bits b1$b$ through bj-1$b$ control the gate operation of pMOSFETs p1 through pj-1. The sources of nMOSFETs 604 are operatively connected to ground, while the sources of pMOSFETs 605 are operatively connected to voltage source Vdd through resistor R.

When adjacent conductive elements 104 are operatively connected through electrical connections 105, the drains of the corresponding pMOSFETs, for example v1 are at zero volts or logic low. When adjacent conductive elements 104 are not operatively connected due to existences of electrical insulation regions 106, the drains of the corresponding pMOSFETs, for example v2 is at Vdd or logic high. Therefore, bit b1, b1$b$ corresponds to v1, and so forth, and bit bj-1, bj-1$b$ corresponds to vj-1. By putting a single bit at logic high and the rest at logic low, circular shift register 600 is able to map the random electrical connections and insulations of interconnect structure 103.

In a challenge-response authentication scenario, V1 through Vj-1 form a set of the random numbers which provide the numerical foundation of the challenge-response pairs.

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention as defined by the accompanying claims.

What is claimed is:

1. An integrated circuit comprising:
   a reset input and a clock input;
   a circular shift logic, for use in producing circularly shifting test patterns, wherein the
   circular shift logic comprises the reset and clock input and one or more outputs and complement outputs, wherein the one or more outputs are operatively connected with the reset input and the clock input, and wherein each output corresponds to a complement output;
   a plurality of n-channel metal-oxide-semiconductor field-effect transistors (nMOSFET),
   wherein a nMOSFET comprises a gate, a source, and a drain, wherein the source is operatively connected with zero voltage, the gate is operatively connected with an output of the circular shift logic, and the drain is operatively connected with a conductive element of the randomly patterned interconnect structure; and
   a plurality of p-channel metal-oxide-semiconductor field-effect transistors (pMOSFET),
   wherein each pMOSFET corresponds to a nMOSFET, and wherein the pMOSFET is operatively connected with a conductive element of the randomly patterned interconnect structure adjacent to the conductive element operatively connected with the corresponding nMOSFET, and wherein a pMOSFET comprises a gate, a source, and a drain, wherein the source is operatively connected with a voltage source, the gate is operatively connected with a complement output of the circular shift logic, and the drain is operatively connected with a conductive element of the randomly patterned interconnect structure.

2. The integrated circuit of claim 1, wherein one output of the circular shift logic is at logic high and rest of the outputs are at logic lows.

* * * * *